(12) United States Patent  
Tang

(10) Patent No.: US 8,718,731 B1  
(45) Date of Patent: May 6, 2014

(54) SHOCK-ABSORBENT ELECTRONIC DEVICE CASE

(71) Applicant: Wai Tang, Englewood, CO (US)

(72) Inventor: Wai Tang, Englewood, CO (US)

( * ) Notice: Subject to any disclaimer, the term of this patent is extended or adjusted under 35 U.S.C. 154(b) by 0 days.

(21) Appl. No.: 13/966,696

(22) Filed: Aug. 14, 2013

Related U.S. Application Data

(60) Provisional application No. 61/758,570, filed on Jan. 30, 2013.

(51) Int. Cl.
*H04M 1/00* (2006.01)
(52) U.S. Cl.
USPC .................. 455/575.8; 455/575.1; 455/575.3; 455/347; 206/320; 206/305; 206/523; 361/679.55; 361/679.56; 361/679.3
(58) Field of Classification Search
CPC ... H04M 1/0252; H04M 1/185; H04B 1/3888
USPC ............. 455/575.1, 575.3, 575.4, 575.8, 347; 206/320, 305, 523, 576; 361/679.55, 361/679.56, 679.3
See application file for complete search history.

(56) References Cited

U.S. PATENT DOCUMENTS

| | | | |
|---|---|---|---|
| 4,925,149 A | 5/1990 | DiFrancesca et al. | |
| 6,616,111 B1 | 9/2003 | White | |
| 7,938,260 B2 | 5/2011 | Lin | |
| 8,439,191 B1 * | 5/2013 | Lu | 206/320 |
| 8,599,547 B2 * | 12/2013 | Richardson et al. | 361/679.3 |
| 2002/0079244 A1 | 6/2002 | Kwong | |
| 2013/0098790 A1 * | 4/2013 | Hong et al. | 206/320 |

* cited by examiner

*Primary Examiner* — Tuan Pham
(74) *Attorney, Agent, or Firm* — Daniel Boudwin; Global Intellectual Property Agency LLC

(57) ABSTRACT

The present invention describes a multi-piece electronic device case comprising multiple shock absorbing features. The device includes an upper protective shell, a lower shell, and a rear-mounted shock panel which form the casing around an electronic device. The upper and lower shells are shaped to include a gap between the case and the electronic device. Within the gap are a plurality of curved, force attenuating panels therein that are configured to flex when impacted, thereby distributing the forces applied to the impacted area. Additionally, the backs of the shells include slots for receiving bumper inserts that further distribute impact forces that occur on the upper and lower sides of the electronic device.

3 Claims, 3 Drawing Sheets

SHOCK-ABSORBENT ELECTRONIC DEVICE CASE

CROSS REFERENCE TO RELATED APPLICATION

This application claims the benefit of U.S. Provisional Application No. 61/758,570 filed on Jan. 30, 2013, entitled "Work Hard Play Safe Phone Case". The above identified patent application is herein incorporated by reference in its entirety to provide continuity of disclosure.

BACKGROUND OF THE INVENTION

1. Field of the Invention

The present invention relates to an electronic device case. More specifically, the present invention relates to a cellular phone case, whereby the case is secured over a cellular phone and comprises multiple shock absorbing features that are adapted to protect a phone located therein from physical damage caused by impacts and shock events.

Cellular phones have quickly become an essential part of our everyday lives. They are no longer just for communication purposes, but now are used for event planning, directions, games, shopping, business decisions, and internet use. Because of the continually expanded use of these devices, it is rare for people to leave their homes without them. As such, the enhanced value of mobile devices requires that they are protected from drops, spills, or any other situations that may cause physical harm to the device.

To protect cellular phones from scratches, dents, and other forms of forms of physical damage, many users turn to purchasing cases for their phones. These cases come in the form of plastic or rubber covers that enclose the phone, where the phones are protected and prevented from coming into direct contact with articles in the outside environment. These cases are specially made for each cellular phone and are available in a variety of shapes in sizes to correctly fit each phone. However, even though the casing is specially made for an individual phone, problems still may still arise if the phone endures frequent or significant abuse.

Many users prefer to reject the use of cellular phone cases because they believe that the case takes away from the aesthetic value of the phone, whereby they instead opt for choosing an insurance plan. While this may seem like a wise decision, the insurance plans do not protect against common occurrences such as scratches and dents that don't harm the functioning of the device. Moreover, some insurance plans do not cover damages that are caused by the user, such as physical damages from drops.

There are several devices that attempt to provide cellular phone protection. These devices come in the form of cellular cases that include rounded corners made of shock absorbing materials; however these cellular phone protective cases fail to address the setbacks of not having protective features on the sides and the around the face of the phone.

The present invention pertains to a new and improved electronic device protective case, whereby the case is secured around the electronic device and includes shock absorbent elements for impact protection. The sides and face of the case are rounded and included energy attenuating panels, while the rear of the case includes shock absorbing bumpers in order to protect the device when it is dropped on its edge or on its back. This provides a barrier to keep an electronic device safe when dropped. The device resembles a standard smart phone case in size and shape and is preferably constructed from plastic, thermoplastic polyurethane or another suitable material.

2. Description of the Prior Art

Devices have been disclosed in the prior art that relate to protective cases. These include devices that have been patented and published in patent application publications. These devices generally relate to cellular phone cases. The following is a list of devices deemed most relevant to the present disclosure, which are herein described for the purposes of highlighting and differentiating the unique aspects of the present invention, and further highlighting the drawbacks existing in the prior art.

Devices in the prior art largely relate to cellular phone protective cases that include rounded corners of shock absorbing material, whereby these corners protect the phone against impacts from falls that result in impacts against the corners of the device, which might cause permanent physical damage. However, while useful for their own right, these items fail to anticipate the cellular phone protective case of the present invention. The present invention provides more complete and comprehensive protection, whereby the case comprises shock absorbing panels located around the periphery of the case, and load attenuating, bumper-like inserts.

One such device in the prior art is U.S. Pat. No. 7,938,260 to Lin, which describes a shock and scratch-absorbing protection cover for portable products, whereby the cover includes an air chamber having an inner region defining an opening for access into the chamber, wherein the chamber offers protection by being sleeved over the portable product. However, while the device of Lin applies a protective cover to portable devices, and is similar in nature and relevant to the present invention, it differs in that it lacks protective shock-absorbing panels configured for protecting a cellular phone.

Another device is U.S. Patent Publication No. 2002/0079244 to Kwong, which describes an improved enclosure for shock protection, whereby the device provides protection for external data storage devices. The device includes a pair of upper and lower-soft inner enclosures and an interface connector for corresponding with a computer. However, although the device of Kwong teaches a protector for an electronic device, the present invention differentiates itself from the prior art in that it provides shock absorbing panels that attenuate the effects of a drop.

Yet another device is U.S. Pat. No. 4,925,149 to DiFrancesca, which teaches a shock absorbing unit, whereby the unit is constructed to prevent damages to remote controlled devices similar to that as used by televisions and other electronic equipment. The device includes a solitary design having structures at either end that are capable of receiving an end of a remote control device. While the device of DiFrancesca is similar in nature and relevant to the present invention, it differs from the present invention in that it fails to provide a protective casing comprising shock absorbing panels similar to that as disclosed by the present invention.

Finally, U.S. Pat. No. 6,616,111 to White teaches a handheld electronic device protector having a one piece design, whereby the design forms an X-shape. The X-shaped design includes a set of four corner pockets, wherein the pockets are configured to receive the corners of the electronic device. Although the device of White provides a protective cover for electronic devices and is similar in nature and relevant to the present invention, it differs from the instant invention in that it fails to provide protection along the sides of the device.

The present invention provides a device that protects a cellular device against drops and falls, thereby preserving the physical integrity of the device in a fall. The case is secured over a cellular phone and includes multiple shock absorbing elements featured around its perimeter and backside. These provide protection along different angles of the phone if dropped. The case comprises three separate portions that form a shield about the phone, wherein the portions include top and bottom shells and a rounded center section that includes bumper-like, shock absorbing inserts that protect the backside of the electronic device.

The multiple energy attenuation features provide the electronic device with levels of protection that are not anticipated by the prior art devices. The device includes a plurality of curved, shock absorbing panels that reside around the perimeter of the device. These panels flex when impacted and provide a barrier that prevents direct contact between the electronic device and the outside object. The upper and lower shells also include cutouts, which are configured for receiving bumper-like inserts. These inserts slide into the upper and lower cutouts and are configured to flex or deform during impacts, thereby lessening the forces applied to the electronic device during impacts. The case can be offered in various sizes to accommodate different sized phones and electronic device, as well as a variety of colors to suit user preference.

It is submitted that the present invention is substantially divergent in design elements from the prior art, and consequently it is clear that there is a need in the art for an improvement to existing cellular phone protecting devices. In this regard the instant invention substantially fulfills these needs.

SUMMARY OF THE INVENTION

In view of the foregoing disadvantages inherent in the known types of cellphone cases now present in the prior art, the present invention provides a new device wherein the same can be utilized for providing convenience for the user when an enhanced electronic device protector is desired that provides protection by having shock absorbers and port covers to provide resistance against liquids and drop events.

It is therefore an object of the present invention to provide a new and improved electronic device protecting device that has all of the advantages of the prior art and none of the disadvantages.

It is another object of the present invention to provide an electronic device protecting device comprising shock absorbing panels, whereby the absorbers are positioned around the periphery of the case.

Yet another object of the present invention is to provide a plurality of shock absorbing bumper-like inserts within the case interior and behind the electronic device positioned therein, whereby the inserts attenuate energy along the backside of the phone during a fall.

Another object of the present invention is to provide an electronic device protecting device comprising multiple forms of impact energy attenuating absorber elements.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
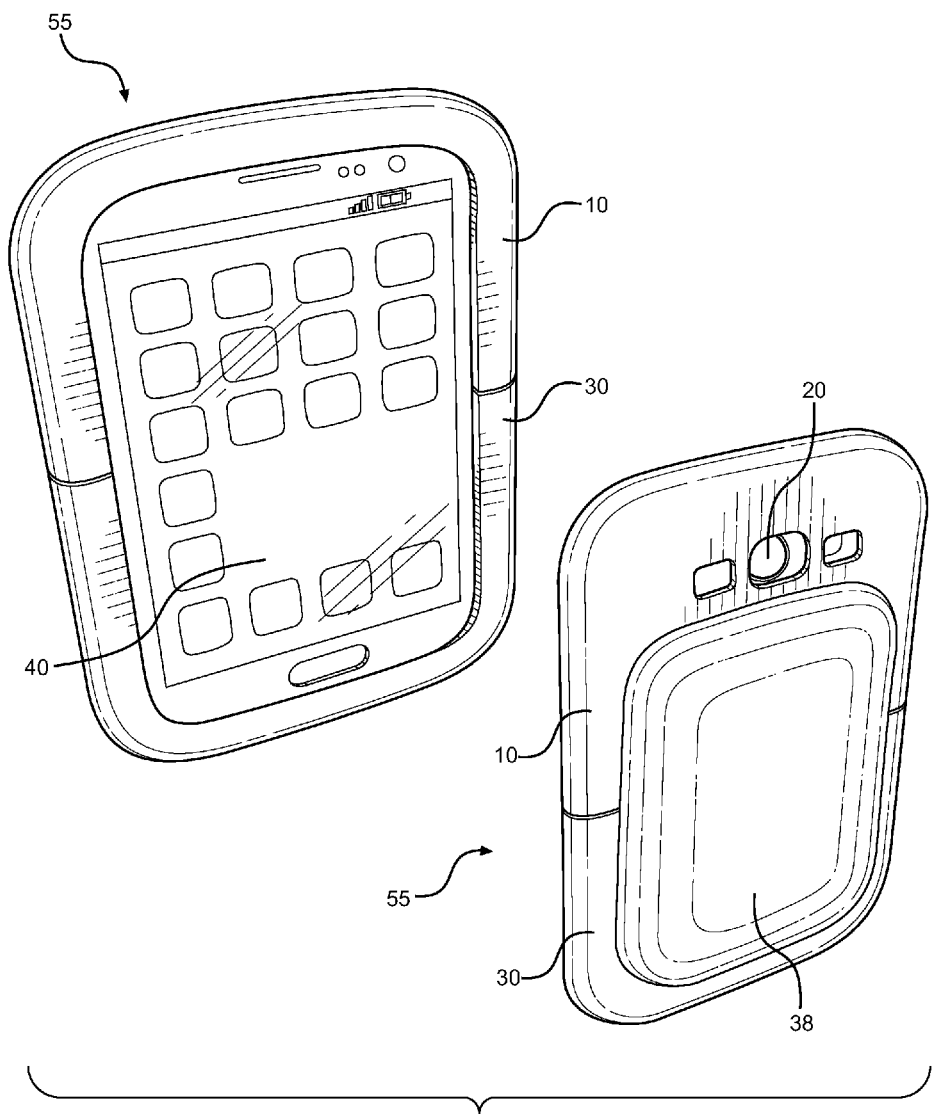
FIG. 1 shows front and back perspective views of the electronic device case of the present invention, whereby the case includes upper and lower shells, and a shock absorbing rear section adapted to protect against falls or drops.

Reference is made herein to the attached drawings. Like reference numerals are used throughout the drawings to depict like or similar elements of the protective casings. For the purposes of presenting a brief and clear description of the present invention, the preferred embodiment will be discussed as used for protecting handheld electronic devices such as cellular phones, media players, and tablet computers. The figures are intended for representative purposes only and should not be considered to be limiting in any respect.

Referring now to FIG. 1, there are shown front and back perspective views of the electronic device case 55 of the present invention, which is designed to protect an electronic device 40 from falls and impacts from multiple directions. The electronic device case 55 is preferably constructed from plastic, thermoplastic polyurethane or other suitable material can offer energy attenuation through deformation and load distribution around the case during an impact event that reduces the load transfer to the phone therein. The case 55 comprises upper 10 and lower 30 protective shells that interlock to seal an electronic device 40 therein, whereby the upper shell 10 includes openings 20 for all the holes and ports that are found on a device 40 and the lower section 30 includes a rear-mounted shock panel 38. The port and hole openings 20 are configured to enable the use of the accessories of the cellular device, including that of a camera, light/flash, and speaker.

Figure 2:
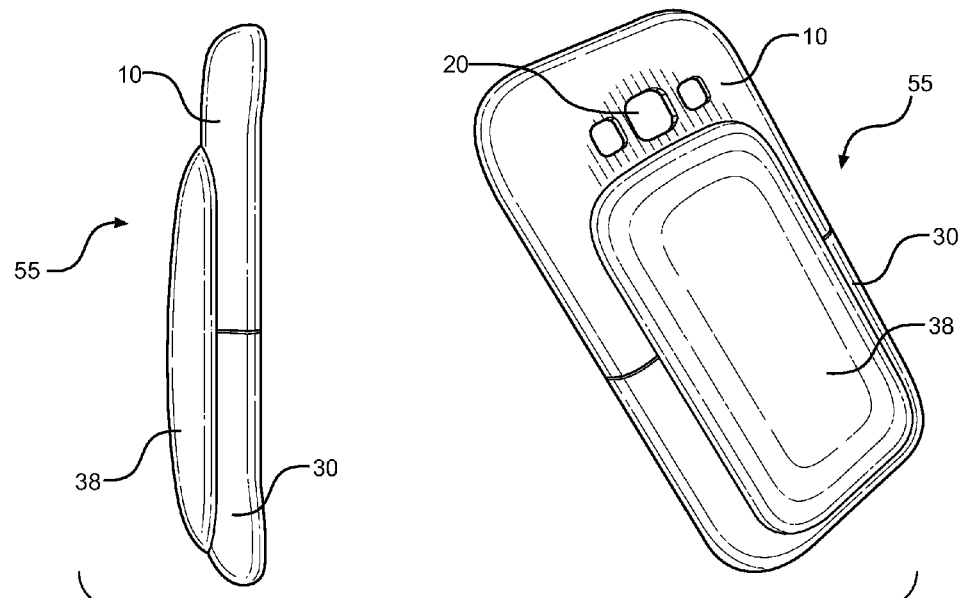
FIG. 2 shows side and perspective views of the electronic device case of the present invention, whereby the case includes upper and lower shells, and a shock absorbing rear section adapted to protect against falls or drops.

Referring now to FIG. 2, there are shown back and side perspective views of the electronic device case 55 of the present invention, whereby the first image is the side view and the second image is of the back perspective view. The corners, face and sides of the upper 10 and lower shells 30 of the case 55 are rounded in order to protect the corner of the device therein. Additionally, the lower shell 30 includes a rear-mounted shock panel 38. The rounded rear panel 38 is attached to the lower section 30 and extends upwardly therefrom. The panel 38 is a thickened rear portion of the case that provides an energy barrier between the back of the case 55 and objects of the outside environment, whereby the section deforms upon impact to absorb and spread energy. The rounded panel 38 deforms inward when physically impacted, which serves to distribute the impact forces throughout its section, thereby lessening the forces that are transferred to the back of the electronic device within the case 55.

Figure 3A:
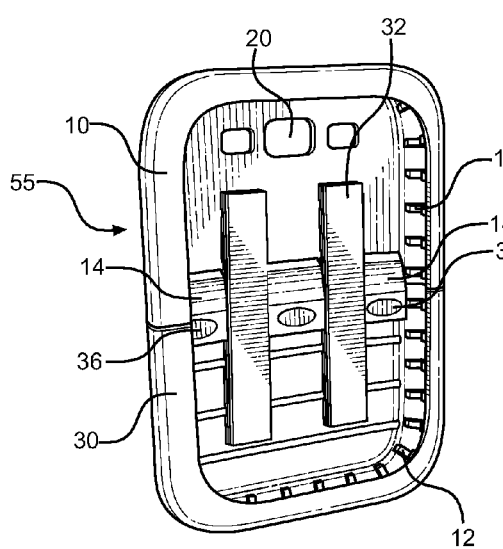
FIG. 3A and FIG. 3B show views of the connection between upper and lower halves of the electronic device case.
Figure 3B:
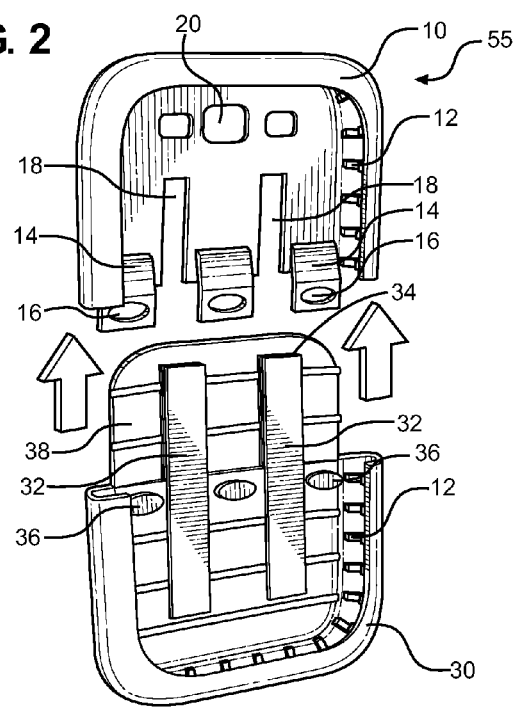

Referring now to FIGS. 3A and 3B, there are shown views of the interior of the case, whereby in FIG. 3A the view is of the assembled case and in FIG. 3B there is displayed arrows showing the direction of the case where the upper 10 and lower 30 shells are separated from each other.

In the constructed view of FIG. 3A, there is shown the upper shell 10 connected to the lower shell 30. The upper shell 10 includes a rounded perimeter lip that supports internal, shock absorbing paneling 12 therein, a set of shell attachment clips 14 having apertures thereon, port apertures 20, and a pair of bumper insert receiving slots (see FIG. 3B) disposed within the upper shell interior and adapted to accept the bumper inserts 32 of the rear shell therethrough. The bumper inserts 32 of the case 55 are adapted to be positioned along the rear of an electronic device fitted within the case when the case 55 is assembled.

The lower shell 30 of the constructed view of FIG. 3A includes a plurality of shock absorbing panels 12 disposed in the same manner as the upper shell 10, a pair of bumper inserts 32 along the interior of the case, and a set of three projections 36 adapted to secure through the apertures of the upper shell attachment clips. The shock absorbing panels 12 are disposed within the interior of the rounded sides and corners of both the upper 10 and lower shells 30 of the casing 55, whereby the panels 12 protect the electronic device during drops by absorbing impacts around its perimeter edge. The panels 12 are flat members adapted to accommodate the size of the electronic device within the interior of the case 55, whereby the static shape of the panels 12 is adapted to deform and buckle during impacts, facilitating the distribution of the forces applied to the impact area when a drop occurs and attenuating the energy before the electronic device is impacted. The panels 12 are further adapted to offset the perimeter of the electronic device perimeter edge from the sides of the case to allow the panels 12 to deform during impact and reduce the likelihood and severity of contact with the electronic device during a drop event.

Referring now to FIG. 3B, there is shown a view of the disassembled electronic device case 55, whereby the case comprises an upper 10 and lower shell 30, a rear-mounted shock panel 38 attached to the lower shell 30, and bumper inserts 32 within the case interior that are attached to the lower shell 30. The bumper inserts 32 bridge the upper 10 and lower shells 30, whereby the bumper inserts 32 include channels 34 along their sides that slidably accept the edges of the receiving slots 18 of the case upper shell. When fully engaged in the upper shell receiving slots, the two case shells are aligned about the electronic device positioned within the case.

The upper shell 10 receiving slots 18 are sized and configured for receiving the bumper inserts 32 therein. Receiving slot of the upper shell 10 slides over the bumper inserts 32 of the lower shell 30 until the upper shell 10 is covered by the rounded panel 38, whereby the bumper inserts 32 and upper receiving slots 18 are concealed by the rounded panel 38 from the rear of the case and the receiving slots 18 have fully accepted the lengths of the bumper inserts 32.

The upper shell 10 further includes a set of clips 14 that are connected to a lower edge of the upper shell 10 and extend downward therefrom. The clips 14 each include apertures 16 that facilitate the connection between the upper 10 and lower shells 30. The lower shell 30 includes matching projections 36 configured for mating with the apertures 16 of the clips 14. To secure the upper 10 and lower shells 30 together, the bumper inserts 32 are slid over the receiving slots, then the shells 10, 30 are moved toward each other until the clips 14 of the upper shell 10 pass over the projection 36 of the lower shell 30 and are secured within the aperture 16 of the upper shell 10. The connection of the shells 10, 30 when the projections 36 are within the apertures 16 of the clips 14 creates a substantially uniform case 55, which provides a smooth transition from the upper shell 10 to the lower shell 30. This action is conducted when the electronic device is positioned within the case interior, whereby the shells converge on the upper and lower end of the device and are secured together to form a protective and largely uniform case therearound.

Figure 4:
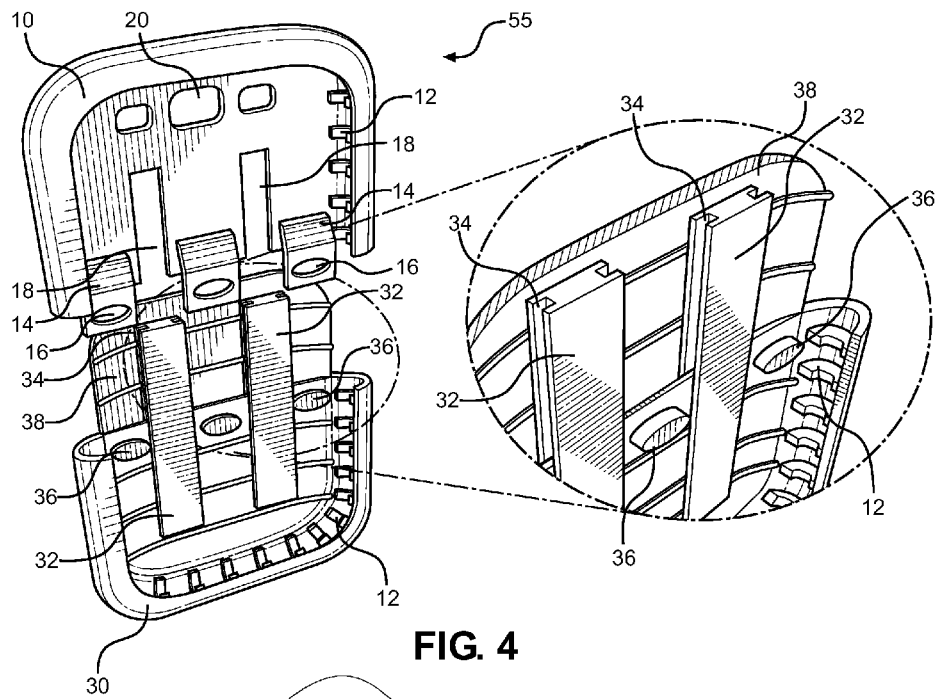
FIG. 4 shows views of the connection between upper and lower halves of the electronic device case, and an exploded view of the bumper inserts.

Referring now to FIG. 4, there is shown views of the connection between upper and lower halves of the electronic device case and a close-up view of the bumper inserts 32, whereby the larger view illustrates the upper 10 and lower 30 shells of the case 55 and the close-up view illustrates the deformable panels 12 within the case perimeter, construction of the bumper inserts 32, and the projections 36 of the lower shell adapted to secure the upper half clips thereto.

The larger view of FIG. 4 resembles that of FIG. 3B, wherein the upper shell 10 is separated from the lower shell 30. The upper shell 10 includes a plurality of panels 12 positioned around the sides and corners of the case 55, clips 14 having apertures 16, receiving slots 18, and hole and port openings 20 that enable the use of the electronic device's peripheral accessories. In the illustration, the lower shell 30 includes bumper inserts 32 having side channels 34 thereal-ong, shell attachment projections 36, and a rear-mounted shock panel 38 for shock absorption. The rounded panel 38 is adapted to cover a portion of the upper shell 10 and provide enhanced protection about the rear of the case.

The second illustration features an enhanced view of the lower section 30, which includes perimeter panels 12, the elongated bumper inserts 32, and projections 36, with a focus on the bumper insert 32 geometry. The case 55 upper shell includes receiving slots 18, which are configured for the reception of the elongated side channels 34 of the bumper inserts 32. The channels 34 are sized to receive the edges of the receiving slots 18 and act as a connector between the shells 10, 30. The bumper inserts 32, in conjunction with the rear portion, are configured to deform when the case is impacted from behind, reducing the load transmitted to the rear of the electronic device. The rounded panel 38 and bumper inserts 32 provides an offset between the electronic device and the impact, whereby the case deforms during impacts, thereby absorbing a large portion of the impact forces and preserving the structural integrity of the electronic device 40.

While the bumper inserts 32 are configured to attenuate the forces applied to the upper and lower perimeter of the case 55, the shock absorbent panels 12 are configured to provide protection along all sides and corners of the case 55. These panels 12 are disposed along the perimeter of the case to match the outer edge profile of the electronic device 55 and are disposed within the outer edge of the case. During impacts, the shock absorbent panels 12 flex inward and deform out of plane to absorb energy. The orientation and flexing of the panels 12 facilitates the distribution of the impact forces among the panels 12. This flexing attenuates the forces observed by an electronic device 40 within the case 55.

Figure 5:
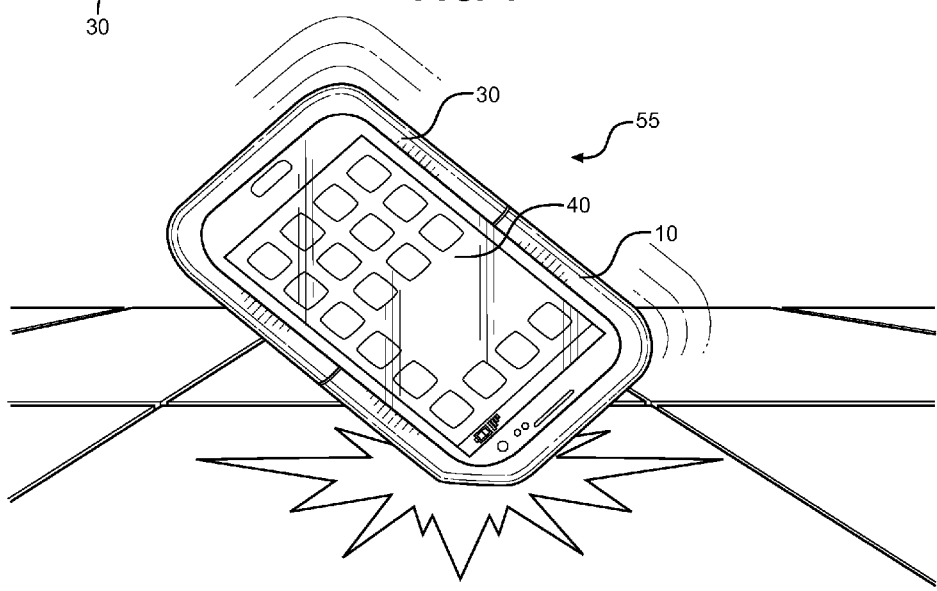
FIG. 5 shows a view of the electronic device case in use, whereby the corner absorbs the impact of a dropped phone.

Referring now to FIG. 5, there is shown a view of the electronic device case 55 in use, whereby the corner of the case 55 absorbs the impact of a dropped device 40. The present invention is designed for those who desire that comprises enhanced protection for their cellular devices. The cellular phone case 55 includes a multi-piece design including an upper shell 10, lower shell 30, bumper inserts 32, and a rear-mounted, rounded panel 38. The upper 10 and lower 30 shells each comprise a plurality of shock absorbing panels 12 disposed within the curved interior of the perimeter of the case 55. The panels 12 attenuate the impact observed by a cellular phone 40 during falls which affect the perimeter of the case 55. Furthermore, the upper 10 and lower 30 shells comprise cutouts 18, which are configured to receive channels 34 formed in the bumper inserts 32. The inserts 32 flex within the space between the rounded panel 38 and the upper 10 and lower 30 shells during impacts, thereby lessening the forces applied during drops of the phone on the upper and lower sections of the case 55.

The present invention comprises differing features from those which are known in the industry. The cellular phone case 55 of the present invention comprises plurality of protective segments, whereby shock absorbency is facilitated by the paneling 12 and bumper inserts 32. The panels 12 and inserts 32 provide protection against impacts affecting both the corners and the sides of the case 55. The panels 12 and inserts 32 flex to distribute the impact forces throughout the casing 55.

The device can be offered in various sizes to accommodate different sized phones, as well as a variety of colors to suit user preference. Overall, the protective phone case 55 of the present invention comprises multiple force attenuating panels 12 and inserts 32. In this way, it is contemplated that the present invention provides an enhanced cellular phone protective casing 55 that provides a level of impact protection from a plurality of angles.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective case for a cellular phone, comprising:
    a case upper shell and lower shell, said upper shell and lower shell having a rear surface, an upstanding perimeter lip having an concave interior, and an open interior adapted to accept an electronic device therein;
    said upper shell having a lower edge, said lower edge having at least one receiving slot and at least one lower shell attachment clip;
    said lower shell further comprising an upper edge, a rear-mounted shock panel extending from said upper edge, at least one elongated bumper insert extending from said upper edge, and at least one upstanding projection;
    said lower shell attachment clip having an aperture configured to receive a lower shell upstanding projection;
    said rear-mounted shock panel partially overlapping said upper case when said upper shell lower edge and said lower shell upper edge are abutted;
    a plurality of shock absorbing panels disposed within said upstanding perimeter lip of said upper and lower shells;
    said bumper insert being insertable within said upper surface receiving slot.

2. The protective case of claim 1, wherein said panels comprise a material adapted to deform during an impact in order to provide energy attenuation.

3. The protective case of claim 1, wherein said ate least one bumper insert further comprises elongated channels along its sides, said channel adapted to receive the edge of said receiving slot of said upper shell.

* * * * *